(12) United States Patent
Ruiz

(10) Patent No.: US 9,344,775 B2
(45) Date of Patent: *May 17, 2016

(54) PIVOTABLE COVER FOR SLIDING TRAY AND SLIDING TRAY INCLUDING THE COVER

(71) Applicant: CommScope, Inc. of North Carolina, Hickory, NC (US)

(72) Inventor: Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,281

(22) Filed: Jun. 19, 2015

(65) Prior Publication Data

US 2015/0289033 A1    Oct. 8, 2015

Related U.S. Application Data

(63) Continuation of application No. 13/468,138, filed on May 10, 2012, now Pat. No. 9,071,890.

(51) Int. Cl.
| | | |
|---|---|---|
| *G02B 6/00* | (2006.01) | |
| *H04Q 1/02* | (2006.01) | |
| *G02B 6/44* | (2006.01) | |

(52) U.S. Cl.
CPC ............ *H04Q 1/023* (2013.01); *H04Q 1/02* (2013.01); *H04Q 1/021* (2013.01); *G02B 6/4452* (2013.01)

(58) Field of Classification Search
CPC .. G02B 6/4452; G02B 6/3897; G02B 6/4455; G02B 6/4453; G02B 6/4454

USPC .................................................. 385/134–137
See application file for complete search history.

(56) References Cited

U.S. PATENT DOCUMENTS

| | | | |
|---|---|---|---|
| 3,831,128 | A | 8/1974 | Paluch |
| 6,321,018 | B1 | 11/2001 | Daoud |
| 6,668,123 | B1 | 12/2003 | Ellison |
| 6,884,942 | B2 * | 4/2005 | McGrath ............... H04Q 1/066 174/135 |
| 2007/0232134 | A1 | 10/2007 | Desrochers |
| 2009/0169164 | A1 | 7/2009 | Sayres |
| 2009/0200057 | A1 | 8/2009 | Caveney et al. |
| 2009/0245746 | A1 | 10/2009 | Krampotich et al. |
| 2010/0296791 | A1 | 11/2010 | Makrides-Saravanos et al. |
| 2011/0200294 | A1 | 8/2011 | Case |
| 2011/0280520 | A1 | 11/2011 | Shimotsu |

FOREIGN PATENT DOCUMENTS

WO    WO 2009/032245    3/2009

* cited by examiner

*Primary Examiner* — Kaveh C Kianni
*Assistant Examiner* — Hung Lam
(74) *Attorney, Agent, or Firm* — Muncy, Geissler, Olds & Lowe, P.C.

(57) ABSTRACT

A sliding tray is configured to support one or more optical communications modules and includes a body portion having one or more mounting locations for the one or more optical communications modules, a trough projecting from the body portion and configured to support optical fibers connected to the one or more optical communications modules, and a cover pivotably connected to the tray for selectively covering the trough.

20 Claims, 6 Drawing Sheets

PIVOTABLE COVER FOR SLIDING TRAY AND SLIDING TRAY INCLUDING THE COVER

CROSS-REFERENCE TO RELATED APPLICATIONS

This application is a continuation of U.S. application Ser. No. 13/468,138 filed May 10, 2012, which claims the benefit of U.S. Provisional Application No. 61/485,670, filed May 13, 2011, the contents of each application are herein incorporated by reference.

FIELD OF THE INVENTION

The present invention is directed toward a pivotable cover for a sliding tray and toward a sliding tray having a pivotable cover, and more specifically, toward a pivotable cover for covering the trough of an equipment rack tray while leaving side openings for cables to exit the trough and toward a sliding tray mountable in a shelf and having such a cover.

BACKGROUND OF THE INVENTION

It is known to mount electrical and/or optical telecommunication modules on sliding trays in a shelf or on a rack or other similar support. The trays may be individually mounted on the support or may comprise part of a shelf with a housing for supporting the trays which housing mounts to the rack or support. Such trays generally comprise a body portion for supporting the modules and a projecting trough for supporting cables or "patch cords" that are plugged into jacks in the modules. The trough may also include retaining rings to help organize and guide individual ones or bundles of the cables or cords.

It is often desirable to space openings in the modules closely to increase the density of the patch cords that can be connected thereto. This leaves very little room on the modules themselves to label the modules or their individual jacks. It can therefore be difficult to determine where a patch cord should be inserted or how a particular patch cord is connected merely by looking at the patch cords and modules. Moreover, even with the use of retaining rings, and especially when a large number of patch cords are present, it is possible to snag or pinch various ones of the patch cords when sliding trays into and out of a shelf or support, either on the tray being moved or on an adjacent tray. It would therefore be desirable to provide a sliding tray that both reduces the likelihood of snagging cords while at the same time provides additional surface area for labeling the modules, jacks and/or the patch cords connected thereto.

SUMMARY OF THE INVENTION

These problems and others are addressed by embodiments of the present invention, a first aspect of which comprises a sliding tray that is configured to support one or more optical communications modules. The tray includes a body portion having one or more mounting locations for the one or more optical communications modules, a trough projecting from the body portion and configured to support optical fibers connected to the one or more optical communications modules, and a cover pivotably connected to the tray for selectively covering the trough.

Another aspect of the invention comprises a shelf with a shelf opening and a plurality of trays mounted for sliding movement relative to the shelf opening. Each of the trays has a body portion with a plurality of mounting locations that are adapted to receive an optical communications module and a trough that projects from the body portion for supporting optical fibers connected to the optical communications modules. The trays also each have a pivotable cover configured to selectively cover the trough. Each of the plurality of trays is configured to slide between a stowed position, where the trough is located a first distance from the shelf opening, and an extended position where the trough is located a second distance greater than the first distance from the shelf opening. A cover of a first one of the plurality of sliding trays is substantially prevented from opening by a bottom surface of an adjacent sliding tray of the plurality of sliding trays when the first one of the sliding trays is in the stowed position.

A further aspect of the invention comprises a pivotable cover for a fiber-supporting trough of a sliding tray that is configured to support one or more optical communications modules. The cover has a main panel having a front, a rear and first and second sides. A front wall depends from the front of the main panel, and first and second parallel side walls extend rearwardly of the main panel rear. The front wall is spaced from each of the first and second side walls by a gap. The front wall comprises a labeling surface, and there is a lens mounted to the front wall.

BRIEF DESCRIPTION OF THE DRAWINGS

These and other aspects and features of the invention will be better understood after a reading of the following detailed description together with the attached drawings, wherein.

DETAILED DESCRIPTION

Figure 1:
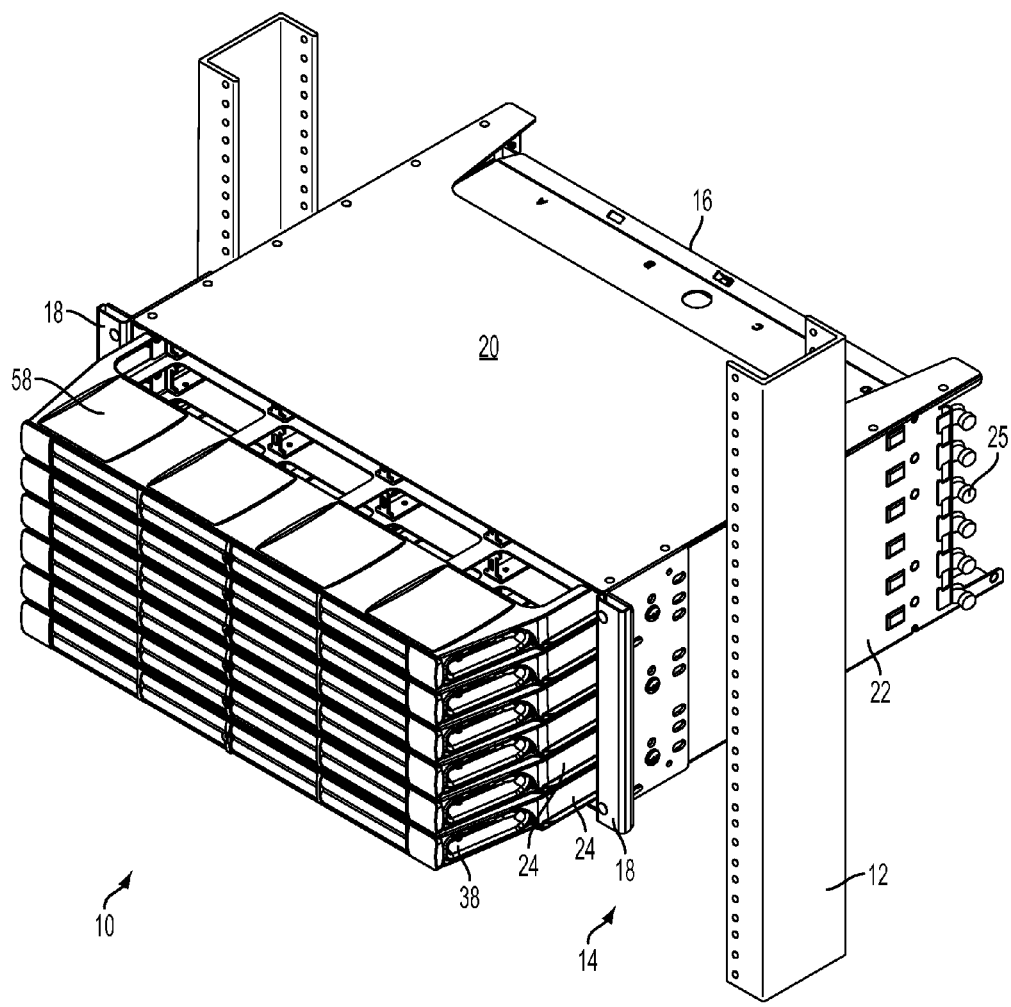
FIG. 1 is a perspective view of a shelf comprising a plurality of sliding trays each configured to support a plurality of communications modules and each having a trough protected by a cover.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
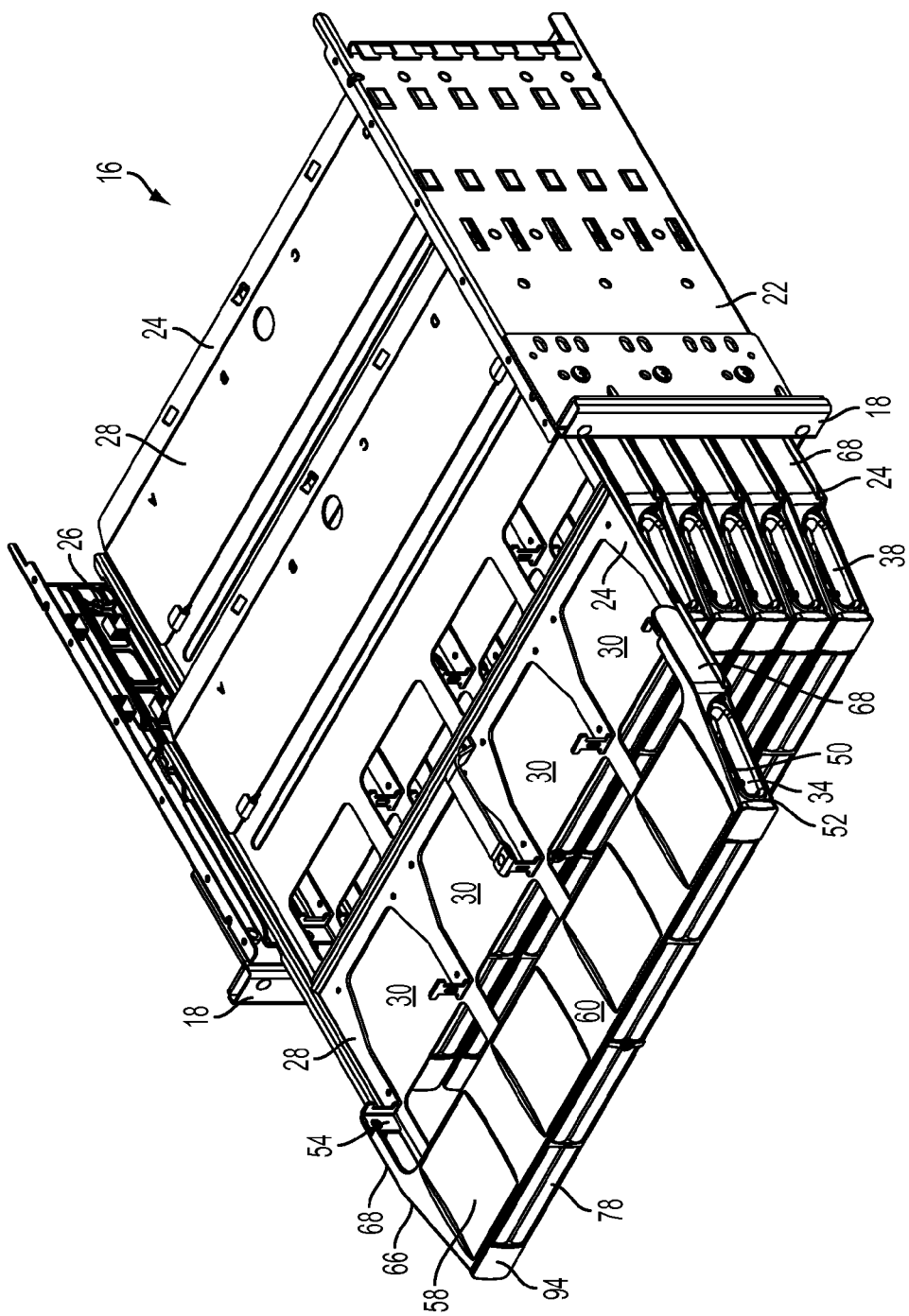
FIG. 2 is a perspective view of the shelf of FIG. 1 showing one of the trays in an extended position with its cover closed.

FIG. 1 shows a rack 10 formed from two equipment rails 12 that define a front opening 14 in which one or more shelves 16 can be mounted by connecting flanges 18 on the shelves 16 to the rails 12. The shelves 16 comprise a top wall 20 and first and second side walls 22 that include structures for supporting a plurality of trays 24 for sliding movement with respect to the shelf 16 and the front opening 14 of the rack 10. The structures may be slots (not illustrated) for receiving edges of the trays 24 or, as illustrated in FIG. 2, drawer slides 26 that cooperate with the side edges of the trays 24 to allow sliding movement of the trays 24 into and out of the shelf 16 in the manner of conventional drawers. The trays 24 may be provided with detents (not illustrated) to selectively hold each tray 24 in a stowed position or an extended position relative to the opening 14. Stops 25, in the form of spring-biased plungers, are provided at the rear of each tray 24 to limit the rearward movement of the trays 24 in the shelf 16. It may sometimes be necessary to access the trays 24 from the rear of the rack 10, and when the stops 25 are displaced, each tray 24 can be pushed further into the shelf 16 so that a greater portion of the tray 24 is accessible from the rear of the rack 10.

Figure 3:
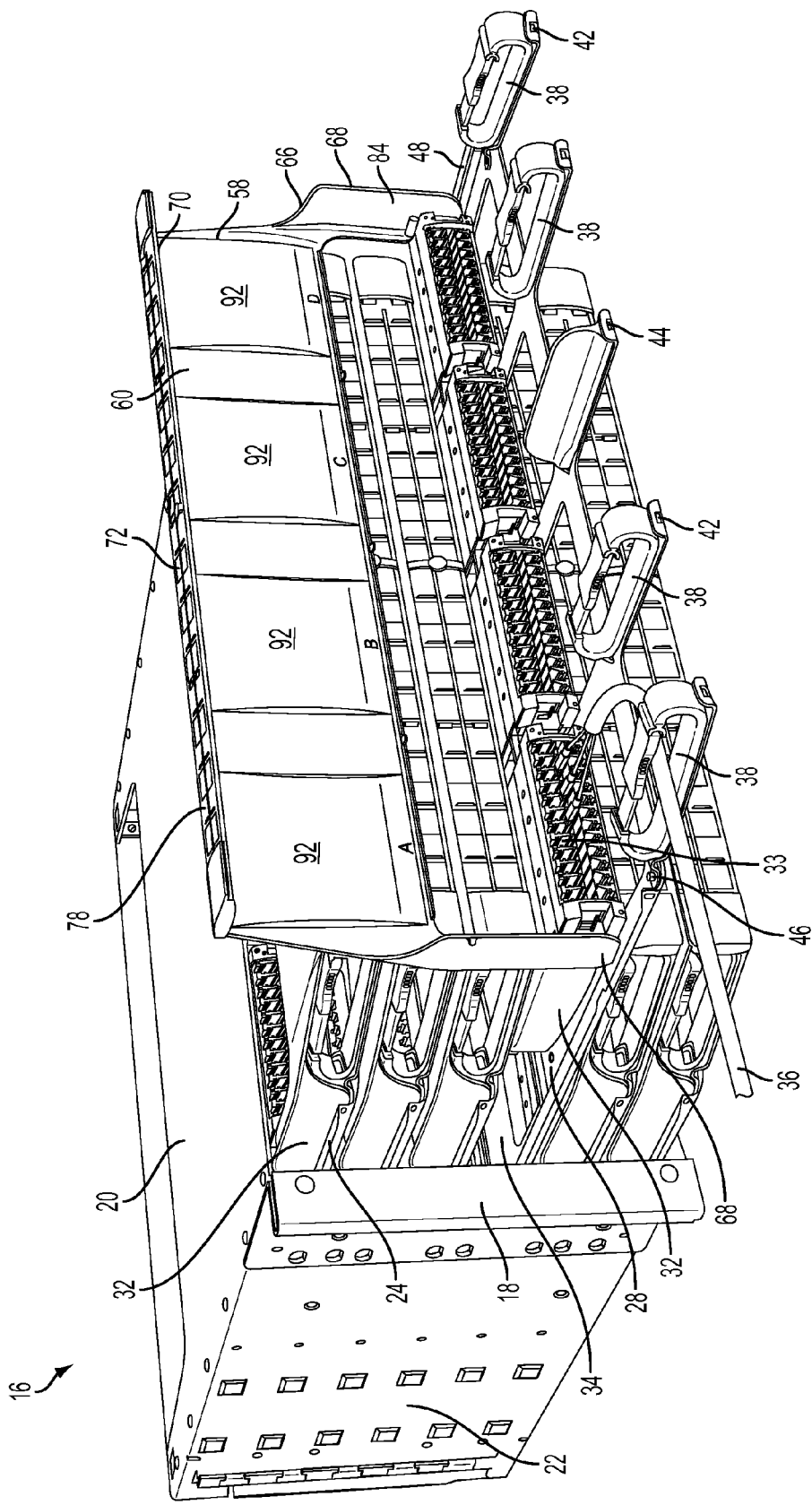
FIG. 3 is a perspective view of the shelf of FIG. 1 showing one of the trays in an extended position with its cover open and also showing communications modules mounted on the trays.
Figure 4:
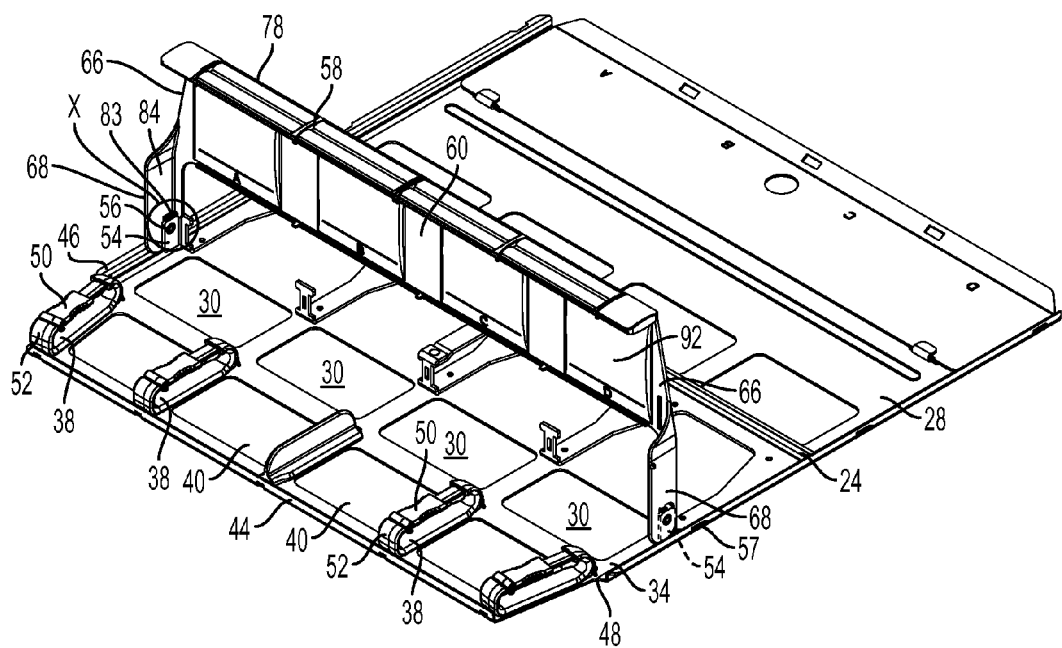
FIG. 4 is a perspective view of one of the trays of the shelf of FIG. 1 with an open cover.

Each of the trays 24 comprises a body portion 28 having a plurality of mounting locations 30 for mounting communications modules 32, illustrated in FIG. 3, and a trough 34 that extends from the body portion 28 for supporting optical cables such as patch cords 36 connected to jacks 33 in the communications modules 32. A plurality of retaining rings 38 are mounted on the trough 34 for organizing and guiding the patch cords 36. The troughs 34 may comprise solid panels (not illustrated) or, as illustrated in FIG. 4, have a plurality of openings 40, or, as illustrated in FIG. 3, be defined by a plurality of fingers 42 projecting from the body portion 28. The particular structure of the trough 34 is not critical as long as it is capable of supporting the patch cords 36 that leave the communications modules 32 as they exit to one side or the other of the shelf 16. The trough 34 includes an outer edge 44, a first side 46 and a second side 48. The retaining rings 38 have tops 50 and front edges 52 facing toward and/or aligned with the outer edge 44 of the troughs 34.

Figure 8:
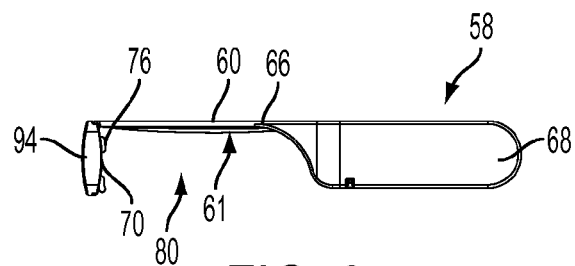
FIG. 8 is a side elevational view of the cover of FIG. 5.

With continued reference to FIG. 4, the body portion 28 also includes first and second upstanding supports 54 located near a junction 57 of the body portion 28 and the trough 34 which supports 54 each include an opening 56 for pivotably supporting a cover 58. As illustrated in FIGS. 5-7 and 11, the cover 58 includes a main panel 60 which main panel 60 has a bottom surface 61, a front edge 62, a rear edge 64 and first and second side edges 66. First and second side walls 68 generally perpendicular to the cover main panel 60 extend from the side edges 66 of the main panel 60 away from the cover rear edge 64. A front wall 70 depends from the front edge 62 of the cover main panel 60 and includes a labeling surface 72 and openings 74 for receiving the mounting tabs 76 of one or more lens elements 78. The width of the front wall 70 may be less than the width of the rear edge 64 so that the cover tapers toward its front. A gap 80, illustrated in FIG. 8, extends between the front wall 70 and each of the first and second side walls 68. Each of the first and second side walls 68 includes a shaft 82 for connecting the cover 58 to the first and second upstanding supports 54 and a stop wall 83. The shafts 82 are coaxial and face each other from the facing inner surfaces 84 of the side walls 68. The stop wall 83, as illustrated in FIG. 4, contacts the top of the upstanding wall 54 when the cover 58 is in the open position to limit movement of the cover 58 to the vertical orientation.

The distance between the facing inner surfaces 84 of the first and second side walls 68 of the cover 58 is approximately the same as the distance between the first and second upstanding supports 54. The cover 58 is connected to the tray 24 by placing the first and second side walls 68 of the cover 58 on the first and second upstanding supports 54 and flexing the first and second side walls 68 of the cover 58 away from each other and inserting the shafts 82 into the openings 56 on the supports 54. The resiliency of the first and second side walls 68 holds the facing inner surfaces 84 of the side walls 68 against the upstanding supports 54 and holds the shafts 82 in the openings 56 when the sidewalls 68 are released. Mounted in this manner, the cover 58 can be pivoted between open and closed positions relative to the tray 24 as discussed below.

Figure 9:
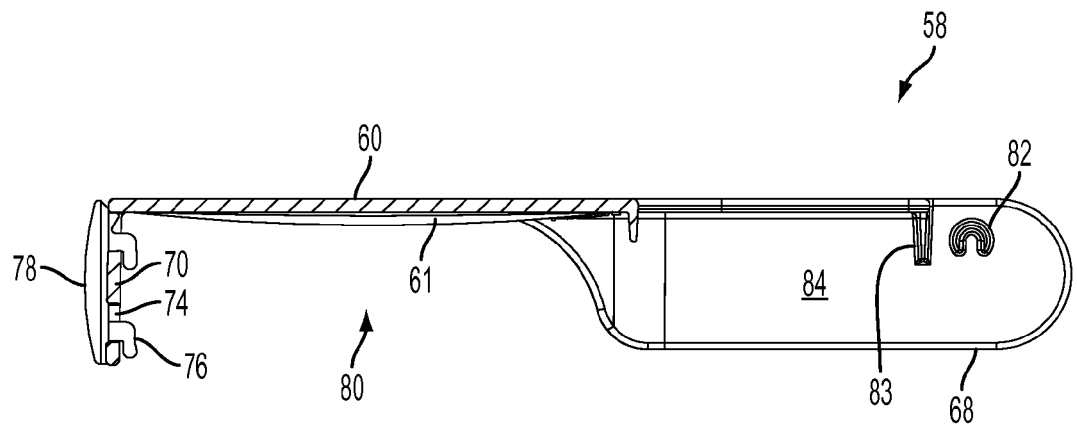
FIG. 9 is a sectional side elevational view taken along line IX-IX in FIG. 6.
Figure 10:
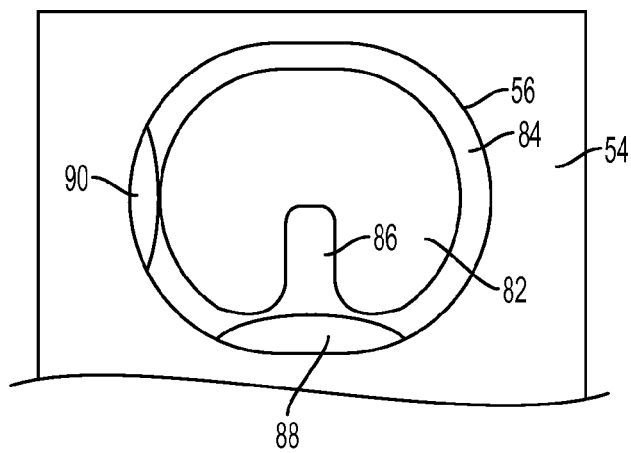
FIG. 10 is a side elevational detail view of region X in FIG. 4.

Preferably, the shafts 82 are generally U-shaped as illustrated in FIGS. 9 and 10 and include a notch 86. The openings 56 include first and second detents 88, 90 configured to cooperate with the notches 86 on the shafts 82 to selectively hold the cover 58 in the open and closed positions. The first detent 88 is provided in the opening 56 on the side of the opening closest to the body portion 28 of the tray 24, and the second detent 90 is provided at the portion of the opening 56 closest to the outer edge 44 of the trough 34 of the tray 24. When the cover 58 is in the closed position, illustrated in FIG. 2, the first detent 88 is received in the notch 86 of the shaft 82, holding the cover in this position. In order to shift the cover to the open position, illustrated in FIG. 4, force is applied to lift the cover which rotates the shaft 82 in the opening 56, clockwise as viewed in FIG. 10, and moves the notch 86 off the first detent 88 and toward the second detent 90. When the cover is fully open, the second detent 90 is located in the notch 86 to hold the cover 58 in this open or raised position. The amount of force required to shift the cover 58 back to the closed position is greater than the force provided by the weight of the cover 58, and thus the cover 58 remains in a raised position until a user applies sufficient force thereto to force the notch 86 off the second detent 90. Alternately, shafts (not illustrated) could be provided on the upstanding supports 54 that would cooperate with openings (not illustrated) in the side walls 68, to support the cover 58 in a similar manner. It may also be possible to rely on the wall 83 engaging the top of the upstanding support 54 to support the cover 58 in the vertical position without the use of the first and second detents 88, 90; however, without the first and second detents 88, 90, only a small force will be required to move the cover 58 from the open to the closed position.

In the closed position, the main panel 60 of the cover 58 overlies the tops 50 of the retaining rings 38, and the front wall 70 of the cover 58 covers the front edges 52 of the retaining rings 38 with the first and second side walls 68 of the cover 58 extending generally parallel to the trough 34. The gaps 80 on the first and second side edges 66 of the cover main panel 60 are located at the first side 46 and the second side 48 of the trough 34 and provide a space for the patch cords 36 to exit the trough 34. The side edges 66 of the cover 58 and the first and second sides 46, 48 of the trough define a further guiding structure for the patch cords 36. Covered in this manner, the likelihood of snagging the patch cords 36 when the trays 24 are moved between stowed and extended positions is also reduced.

In the open position, illustrated in FIG. 3, the first and second side walls 68 of the cover extend generally perpendicular to the trough 34, and the distance between the rear edge 64 of the main panel 60 and the tray 24 leaves a space exposing the communications modules 32 of that tray, thereby allowing the patch cords 36 to be connected to and removed from the modules 32 on the tray 24.

The cover 58 of a tray 24 can only be shifted into the open position illustrated in FIG. 4 when that tray 24 is pulled out of the shelf 16 into the extended position, the position of the topmost tray 24 in FIG. 2. When the trays 24 are in the stowed or retracted positions of FIG. 1, either a higher tray 24 or the top wall 20 of the shelf 16 (removed for illustration purposes in FIG. 2) prevents the shifting of the cover 58 to the open position.

It is becoming increasingly common to manufacture communications modules 32 to hold a high density of patch cords 36 and to allow the modules 32 to be mounted close together to increase the number of modules 32 that can be accommodated by a given space in a shelf 16. Therefore the spaces between the jacks 33 on the front of the communications modules 32 are small, and the jacks 33 may be located very close to outer edges of the front of the modules 32. This leaves little room on the communications modules 32 themselves for labels that identify either the particular communications modules 32 or their jacks 33. The present invention provides a plurality of labeling surfaces for identifying both the modules 32 and the individual jacks 33 on the modules 32. First, the bottom surface 61 of the cover main panel 60 includes a number of module labeling areas 92 equal in number to the number of mounting locations 30 on the body portion 28 of the tray 24. As seen in FIG. 3, these module labeling areas 92 can be used to identify the modules 32 accessible below each of the module labeling areas 92 when the cover 58 is in the open position.

Figure 11:
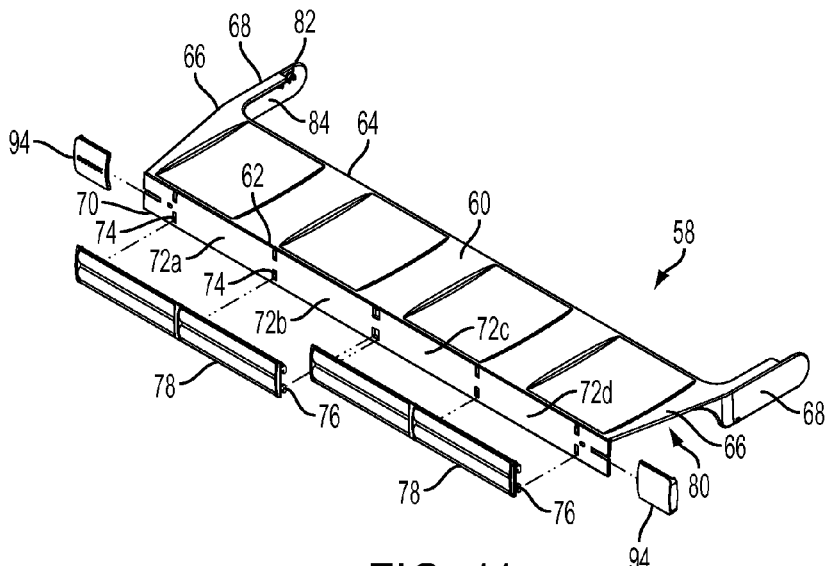
FIG. 11 is an exploded perspective view of the cover of FIG. 5.
Figure 5:
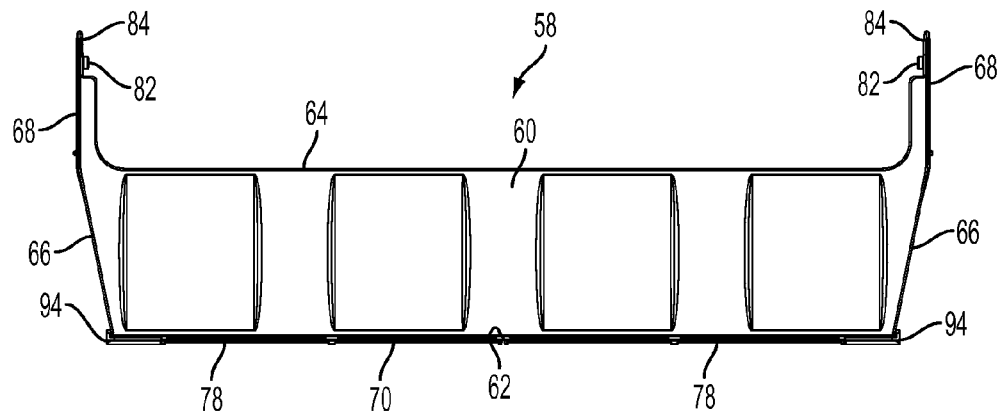
FIG. 5 is top plan view of the cover of one of the trays of the shelf of FIG. 1.
Figure 6:
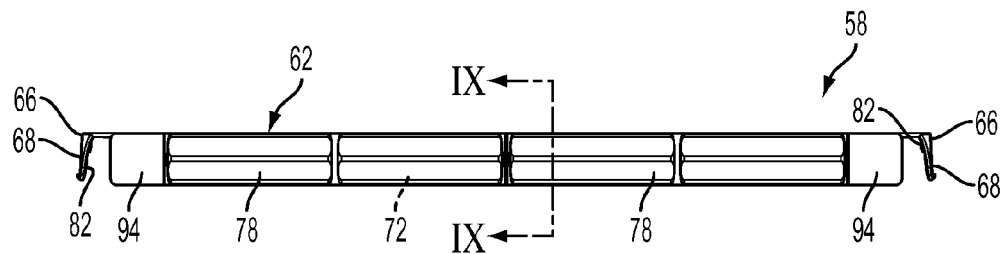
FIG. 6 is a front elevational view of the cover of FIG. 5.
Figure 7:
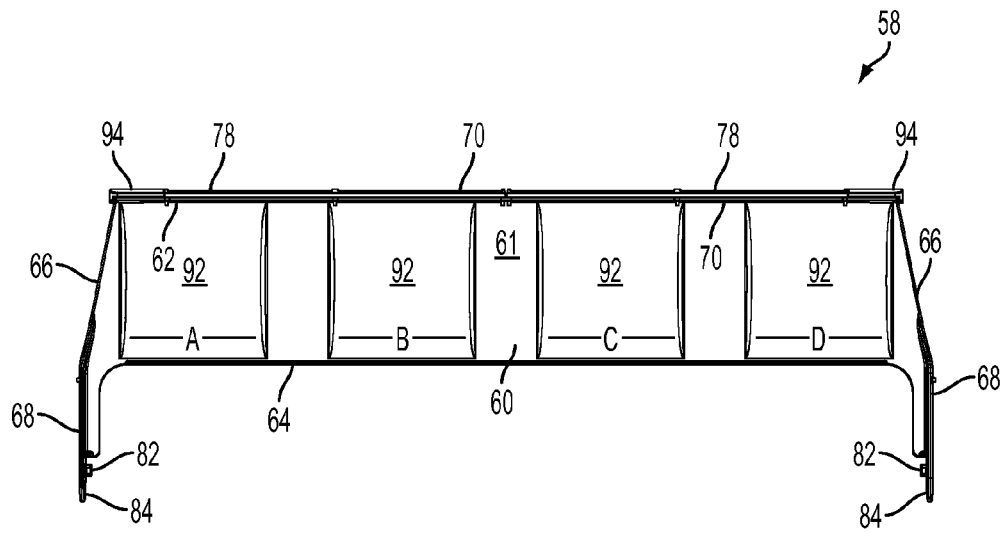
FIG. 7 is a bottom plan view of the cover of FIG. 5.

Next, the front wall 70 of the cover 58 comprises a jack labeling surface 72 on which information can be provided to identify the jacks 33 that lie directly behind the jack labeling surface 72 when the cover 58 is closed. The labels (not illustrated) that are mounted on this jack labeling surface 72 are preferably protected by a lens 78 having mounting tabs 76 that are removably insertable into the openings 74 in the jack labeling surface 72; however, the lens can be attached to the labeling surface 72 in other manners. Separate lenses 78 can be provided for separate labeling surface regions 72a, 72b, 72c and 72d as illustrated in FIG. 11, and/or the lenses 78 themselves may include a plurality of lens elements associated with each of the labeling surface regions 72a, 72b, 72c and 72d. Alternately, a single lens 78 may be provided that covers substantially the entire jack labeling surface 72. If the lenses 78 do not extend all the way to the edges of the jack labeling surface 72, end caps 94 may be provided on either side of the jack labeling surface 72 to give the front wall 70 of the cover 58 an even appearance.

While the front wall 70 of the cover 58 is not easily visible when the cover 58 is in its open position, a person accessing the patch cords 36 and/or jacks 33 in the communications modules 32 may either view the labeling surface 72 before opening the cover and note, for example, that he needs to remove a plug from the third jack in the top row based on the indicia on the labeling surface 72 or, alternately, the cover 58 may be held in a partially open position, at a 45 degree angle to the tray 24, for example, to allow both the labeling surface 72 and the jacks 33 to be viewed at the same time while a decision regarding which plug or jack to access is made. Beneficially, the cover 58 reduces the need to label the small surfaces of the modules 32 around the jacks 33 and at the same time reduces the possibility of the patch cords 36 being pinched or snagged as the trays 24 are moved.

The present invention has been described herein in terms of a preferred embodiment. Modifications and additions to this embodiment will become apparent to those of ordinary skill in the relevant art upon a reading of the foregoing disclosure. It is intended that all such modifications and additions comprise a part of the present invention to the extent they fall within the scope of the several claims appended hereto.

What is claimed is:

1. A sliding tray configured to support one or more optical communications modules comprising:
   a body portion having one or more mounting locations for the one or more optical communications modules;
   a trough projecting from a front of the body portion and configured to support optical fibers connected to the one or more optical communications modules; and
   a cover pivotably connected to the tray and selectively pivotable between an open position providing access to the trough and a closed position covering the trough, wherein said cover includes a main panel having a front edge, a rear edge and first and second side edges with a front wall depending from the front edge of the main panel, wherein the cover is connected to the tray between a rear of the body portion and a front, outer edge of the trough, and wherein in the closed position, the main panel covers the top of the trough.

2. The sliding tray of claim 1, wherein said cover further includes first and second side walls depending from the first and second side edges of the main panel.

3. The sliding tray of claim 2, wherein the first and second side walls are connected to the tray near a junction of the body portion and the trough and, wherein when the cover is in the closed position, the main panel covers the trough but not the body portion.

4. The sliding tray of claim 1, wherein the front wall comprises a labeling surface and including a lens covering the labeling surface.

5. The sliding tray of claim 1 including a detent for holding the cover in the open position.

6. The sliding tray of claim 2 including first and second spaced supports on the tray, each of the first and second spaced supports including an opening, each of the first and second side walls including a shaft extending into the opening on the first and second supports, respectively, wherein the first and second side walls are mutually parallel and lie in planes perpendicular to the main panel of the tray.

7. The sliding tray of claim 2, wherein said trough has a width between the body portion and the trough outer edge and a length between first and second ends of the trough, and wherein the first and second side walls of the cover are spaced from the front wall of the cover by a gap.

8. The sliding tray of claim 7, wherein the front wall has a width in a direction from the first end of the trough to the second end of the trough less than a distance separating the first and second side walls of the cover.

9. The sliding tray of claim 7, including a plurality of optical communications modules mounted at the one or more mounting locations and a plurality of optical fibers connected to the plurality of optical communications modules, lying on the trough and extending through the gap in the cover at the first end of the trough.

10. The sliding tray of claim 1, wherein the cover includes a labeling surface and including a lens covering the labeling surface.

11. The sliding tray of claim 10, wherein the front wall is perpendicular to the trough when the cover is in the closed configuration and wherein the front wall includes the labeling surface and wherein the lens is removably mounted to the front wall.

12. A pivotable cover for a fiber-supporting trough of a sliding tray configured to support one or more optical communications modules comprising:

a main panel having a front edge, a rear edge and first and second side edges, a front wall depending from the front edge of the main panel and first and second parallel side walls depending from the first and second side edges of the main panel and extending rearwardly of at least a portion of the rear edge of the main panel, the front wall being spaced from each of the first and second side walls by a gap, wherein the front wall comprises a labeling surface and including a lens mounted to the front wall, and wherein each of the first and second side walls includes a shaft.

13. The pivotable cover of claim 12, wherein the shaft of the first side wall extends away from the first side wall to define a pivot axis, and wherein the shaft of the second side wall extends away from the second side wall to also define the pivot axis.

14. The pivotable cover of claim 13, wherein each of the shafts includes a feature for engaging an opening in the tray to form a detent for holding the cover in a predetermined orientation relative to the tray.

15. A sliding tray configured to support one or more optical communications modules comprising:

a body portion having one or more mounting locations for the one or more optical communications modules;

a trough projecting from a front of the body portion and configured to support optical fibers connected to the one or more optical communications modules;

a cover pivotably connected to the tray and selectively pivotable between an open position providing access to the trough and a closed position covering the trough, wherein said cover includes a main panel having a front edge, a rear edge and first and second side edges with a front wall depending from the front edge of the main panel, wherein the cover is connected to the tray between a rear of the body portion and an outer edge of the trough, wherein in the closed position, the main panel covers the top of the trough, wherein said cover further includes first and second side walls depending from the first and second side edges of the main panel, including first and second spaced supports on the tray, each of the first and second spaced supports including an opening, each of the first and second side walls including a shaft extending into the opening on the first and second supports, respectively, and including a detent for holding the cover in the open position.

16. The sliding tray of claim 15, wherein said trough has a width between the body portion and the trough outer edge and a length between first and second ends of the trough, and wherein the first and second side walls of the cover are spaced from the front wall of the cover by a gap.

17. The sliding tray of claim 16, including a plurality of optical communications modules mounted at the one or more mounting locations and a plurality of optical fibers connected to the plurality of optical communications modules, lying on the trough and extending through the gap in the cover at the first end of the trough.

18. The sliding tray of claim 16, wherein the first and second side walls are connected to the tray near a junction of the body portion and the trough and, wherein when the cover is in the closed position, the main panel covers the trough but not the body portion.

19. The sliding tray of claim 16, wherein the front wall comprises a labeling surface and including a lens covering the labeling surface.

20. The sliding tray of claim 16, wherein the first and second side walls are mutually parallel and lie in planes perpendicular to the main panel of the tray.

* * * * *